US010585878B2

(12) United States Patent
Cadarette et al.

(10) Patent No.: US 10,585,878 B2
(45) Date of Patent: *Mar. 10, 2020

(54) PERFORMING CONFLICT ANALYSIS OF REPLICATED CHANGES AMONG NODES IN A NETWORK

(71) Applicant: International Business Machines Corporation, Armonk, NY (US)

(72) Inventors: Paul M. Cadarette, San Diego, CA (US); James D. Spyker, Toronto (CA)

(73) Assignee: International Business Machines Corporation, Armonk, NY (US)

(*) Notice: Subject to any disclaimer, the term of this patent is extended or adjusted under 35 U.S.C. 154(b) by 407 days.

This patent is subject to a terminal disclaimer.

(21) Appl. No.: 15/460,026

(22) Filed: Mar. 15, 2017

(65) Prior Publication Data

US 2017/0228415 A1 Aug. 10, 2017

Related U.S. Application Data

(63) Continuation of application No. 15/019,880, filed on Feb. 9, 2016.

(51) Int. Cl.
*G06F 16/00* (2019.01)
*G06F 16/23* (2019.01)
(Continued)

(52) U.S. Cl.
CPC ........ *G06F 16/2365* (2019.01); *G06F 16/122* (2019.01); *G06F 16/235* (2019.01);
(Continued)

(58) Field of Classification Search
CPC ............... G06F 16/273; G06F 16/2365; G06F 16/2379; G06F 16/122; G06F 16/275; G06F 16/2315; G06F 16/235; H04L 67/1095
(Continued)

(56) References Cited

U.S. PATENT DOCUMENTS 5,787,262 A 7/1998 Shakib et al.
5,806,074 A * 9/1998 Souder ................ G06F 11/2035
(Continued)

FOREIGN PATENT DOCUMENTS

WO 9735270 9/1997

OTHER PUBLICATIONS

List of Patents or Patent Applications Treated as Related, dated Jun. 4, 2019, Total 2 pages.
(Continued)

*Primary Examiner* — Hanh B Thai
(74) *Attorney, Agent, or Firm* — David W. Victor; Konrad, Raynes, Davda and Victor LLP

(57) ABSTRACT

Provided are a computer program product, system, and method for performing conflict analysis of replicated changes among nodes in a network A first node and a second node include a first instance and second instance of a data set, respectively. The second node receives a first transaction replicated from the first node, applied to the first instance of the data set. The second node determines a conflict that would occur between the replicated first transaction and a second transaction applied to the second instance of the data set. A conflict policy is applied at the second node to perform a first action in response to determining the conflict. The conflict policy is applied to the first node to perform a second action at the first node to handle the conflict when the first node receives a replication of the second transaction to the second instance of the data set.

9 Claims, 6 Drawing Sheets

(51) Int. Cl.
*H04L 29/08* (2006.01)
*G06F 16/11* (2019.01)
*G06F 16/27* (2019.01)

(52) U.S. Cl.
CPC ...... *G06F 16/2315* (2019.01); *G06F 16/2379* (2019.01); *G06F 16/273* (2019.01); *G06F 16/275* (2019.01); *H04L 67/1095* (2013.01)

(58) Field of Classification Search
USPC ........................................ 707/633, 635, 690
See application file for complete search history.

(56) References Cited

U.S. PATENT DOCUMENTS

| | | |
|---|---|---|
| 7,103,586 B2 | 9/2006 | Holenstein et al. |
| 7,177,866 B2 | 2/2007 | Holenstein et al. |
| 7,403,946 B1 | 7/2008 | Taylor |
| 7,565,419 B1 | 7/2009 | Kwiatkowski et al. |
| 7,739,237 B2 | 6/2010 | Holenstein et al. |
| 7,779,237 B2 | 8/2010 | Correale, Jr. et al. |
| 7,822,711 B1 | 10/2010 | Ranade |
| 8,090,685 B2 | 1/2012 | Clark et al. |
| 8,396,937 B1 * | 3/2013 | O'Krafka ................ G06F 13/28 709/213 |
| 8,468,244 B2 | 6/2013 | Redlich et al. |
| 9,619,278 B2 * | 4/2017 | Vermeulen ............ G06F 16/273 |
| 9,684,701 B2 * | 6/2017 | Bailey ................ H04L 61/2007 |
| 9,824,132 B2 | 11/2017 | Kulkarni et al. |
| 10,235,407 B1 * | 3/2019 | Morkel ................ G06F 16/284 |
| 2008/0052322 A1 | 2/2008 | Gusciora |
| 2009/0119346 A1 | 5/2009 | Lu et al. |
| 2009/0119349 A1 | 5/2009 | Edlund et al. |
| 2010/0125557 A1 * | 5/2010 | Wang ...................... G06F 16/27 707/690 |
| 2014/0244581 A1 | 8/2014 | Rath |
| 2016/0070589 A1 | 3/2016 | Vermeulen et al. |
| 2016/0350357 A1 | 12/2016 | Palmer |
| 2017/0228411 A1 | 8/2017 | Cadarette et al. |

OTHER PUBLICATIONS

US Patent Application, dated May 30, 2019, for U.S. Appl. No. 16/427,340 (54.136C2) filed May 30, 2019, invented by Paul M. Cadarette et al.,Total 31 pages.

Preliminary Amendment, dated May 30, 2019, for U.S. Appl. No. 16/427,340 (54.136C2) filed May 30, 2019, invented by Paul M. Cadarette et al.,Total 15 pages.

Response to Office Action, dated Dec. 27, 2018, for U.S. Appl. No. 15/019,880 (54.136) filed Feb. 9, 2016, invented by Paul M. Cadarette et al., Total 14 pages.

Notice of Allowance, dated Apr. 17, 2019, for U.S. Appl. No. 15/019,880 (54.136) filed Feb. 9, 2016, invented by Paul M. Cadarette et al., Total 10 pages.

Office Action, dated Sep. 27, 2018, for U.S. Appl. No. 15/019,880 (54.136) filed Feb. 9, 2016, invented by Paul M. Cadarette et al., Total 29 pages.

IBM; "Method and Apparatus of Conflict Reduction in Multi-Source Data Synchronization"; dated Jan. 28, 2010, An IP.com Prior Art Database Technical Disclosure;(online), retrieved from the Internet at URL>http://ip.com/IPCOM/000192673; Total 8 pages.

Anonymously; "Context Aware Diagnostics and Error Correction"; dated Dec. 12, 2012, An IP.com Prior Art Database Technical Disclosure; http://ip.com/IPCOM/000224134; Total 6 pages.

Anonymously; "System for Determining and Executing Corrective Action Using Trace Information and Historical Resolution Data From a Change Management System"; dated Apr. 3, 2014,, An IP.com Prior Art Database Technical Disclosure; (online) retrieved fromt he internet at URL>http://ip.com/IPCOM/000236055; Total 3 pages.

IBM; "Notes Replication Save Conflict Resolution/Archive Tool"; dated Oct. 29, 2002, An IP.com Prior Art Database Technical Disclosure; (online), retrieved from the Internet at URL>http://ip.com/IPCOM/000014650; Total 2 pages.

US Patent Application, dated Feb. 9, 2016, for U.S. Appl. No. 15/019,880 (54.136) filed Feb, 9, 2016, invented by Paul M. Cadarette et al., Total 31 pages.

Preliminary Amendment, dated Mar. 15, 2017, for U.S. Appl. No. 15/019,880 (54.136) filed Feb. 9, 2016, invented by Paul M. Cadarette et al., Total 7 pages.

List of Patents or Patent Applications Treated as Related, dated Mar. 15, 2017, Total 2 pages.

Notice of Allowance, dated Sep. 3, 2019, for U.S. Appl. No. 15/019,880 (54.136) filed Feb. 9, 2016, invented by Paul M. Cadarette et al., Total 23 pages.

* cited by examiner

PERFORMING CONFLICT ANALYSIS OF REPLICATED CHANGES AMONG NODES IN A NETWORK

BACKGROUND OF THE INVENTION

1. Field of the Invention

The present invention relates to a computer program product, system, and method for performing conflict analysis of replicated changes among nodes in a network.

2. Description of the Related Art

In an active continuous availability environment, applications are deployed and executing on two or more sites at the same time, against non-shared copies of the same data. Notwithstanding the possibility of conflicting accesses to the same data, many current environments do not employee locks across sites to serialize access because of the high cost of holding locks over distances greater than 15-20 fiber kilometers. Inbound Online Transaction Processing (OLTP) traffic is routed to a particular site of multiple sites on the basis of current resource availability information in order to achieve maximum performance. Application data changes are captured at both sites and replicated to the alternate site, as a method of synchronization. Because the probability of conflicts is high, in such a configuration, replication/synchronization engines typically employ static conflict resolution rules to avoid conflicting transactions to a database record.

Another conflict resolution technique for managing conflicts between transactions to a same database at different site logs the conflicts for later analysis and resolution by application/business Subject Matter Experts (SMEs).

A still further technique avoids conflicts by partitioning the data set such that one subset of application data is only ever executed on one site.

There is a need in the art for improved techniques for handling conflicts among transactions to data sets and databases maintained at sites at multiple geographical locations.

SUMMARY

Provided are a computer program product, system, and method for performing conflict analysis of replicated changes among nodes in a network A first node and a second node each include one instance of a data set. The second node having a second instance of the data set receives a first transaction replicated from the first node, wherein the first transaction was applied to a first instance of the data set of the first node. The second node determines a conflict that would occur between the replicated first transaction and a second transaction applied to the second instance of the data set. A conflict policy is applied at the second node to perform a first action in response to determining the conflict. The conflict policy is applied to the first node to perform a second action at the first node to handle the conflict when the first node receives a replication of the second transaction to the second instance of the data set at the second node.

DETAILED DESCRIPTION

Prior art techniques for conflict resolution may not take into consideration application semantics or set analysis of previous changes. Techniques that only log changes for later analysis may allow conflicts to perpetuate through data for extended periods until the resolution process is performed, reducing the value of the data copy. Conflict resolution processes that review logs of transactions may require human intervention and be complex and take considerable time to correct the errors which may be recorded in the data. Partitioning the data is also problematic because after the failure of one site, the surviving site would only have its partition of data and not have the data for OLTP traffic directed toward partitions at other sites. When the failing site is recovered, the stranded transactions at the failed site are recovered, but may have numerous conflicts with the newer copy of the data to which traffic was redirected.

Described embodiments provide techniques to improve transaction processing across different sites having copies of the same data set by having a first node having a first instance of the data set replicate a replicated first transaction applied to the first instance of the data set to the second node. The second node determines in real time a conflict that would occur between the received replicated first transaction and a second transaction previously applied to the second instance of the data set at the second node. The second node applies the conflict policy to perform a first action in response to determining the conflict. The same conflict policy is applied at the first node to perform a second action at the first node to handle the conflict when the first node receives a replication of the second transaction to the second instance of the data set at the second node.

Figure 1:
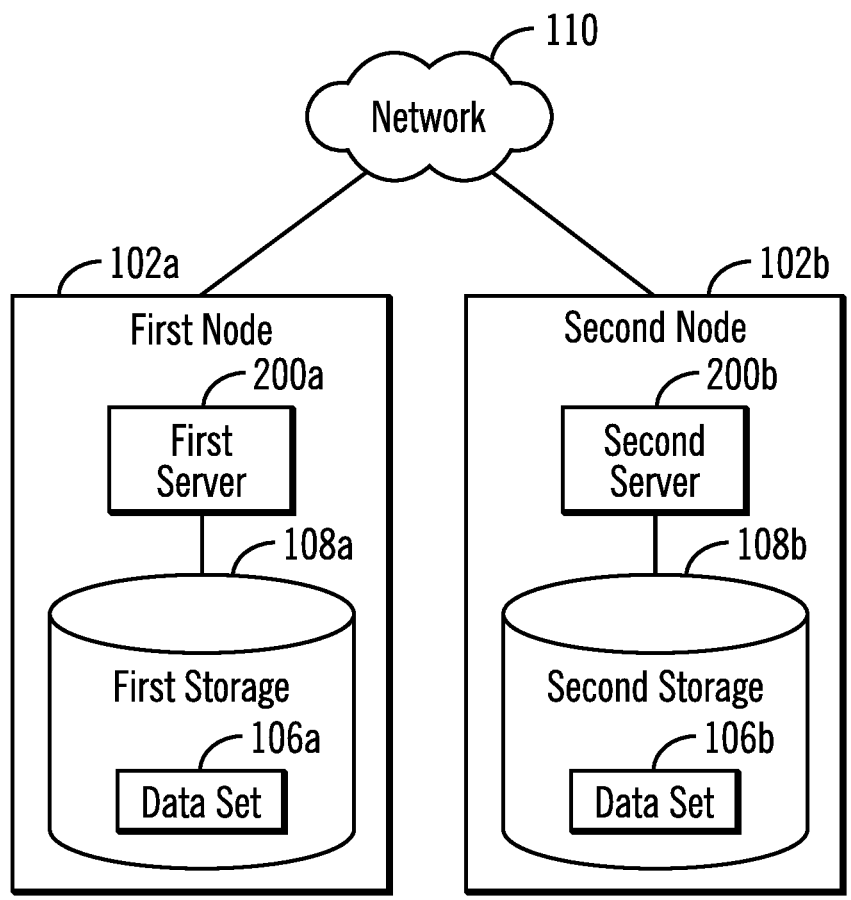
FIG. 1 illustrates an embodiment of a transaction mirroring environment.

FIG. 1 illustrates an embodiment of a mirror computing environment where two nodes 102*a*, 102*b* having first 200*a* and second 200*b* servers mirror transactions to first and second data sets 106*a*, 106*b* in their respective first 108*a* and second 108*b* storages to each other over a network 110. The transactions to the data sets 106*a*, 106*b* may be initiated by connected host systems, connected wired or wireless computing devices, etc.

For instance, each of the storages 108*a*, 108*b* may maintain a copy or instance of the same data set 106*a*, 106*b* that receives transactions from users at different locations to provide geographically distributed copies of the same database or data set. The first 200*a* and second 200*b* servers may mirror transactions to their respective storages 108*a*, 108*b* to other nodes so that all transactions are mirrored and synchronized among the nodes 102*a*, 102*b*, as well as any other nodes. Transactions may be directed to a particular node 102*a*, 102*b* based on transaction and network optimization to select a node 102*a*, 102*b* that can optimize performance of the transaction given the location of the host initiating the transaction.

In one embodiment, the data sets 106a, 106b may comprise transaction oriented databases, and users may be performing different types of database transactions to their accounts implemented in the data sets 106a, 106b, where the transactions may involve changing data in records in the data sets 106a, 106b. For instance, the first 106a and second 106b data sets may maintain financial databases, such as bank or brokerage accounts, and the transactions comprise financial transactions directed to those accounts having account information maintained in both the first 106a and 106b storages. The data sets 106a, 106b may maintain other type of information related to application programs executing at the first 200a and second servers 200b that generate transactions to update data in the first 106a and second 106b data sets. The data sets 106a and 106b may maintain transactions for other types of applications generating transactions.

In certain embodiments, the first 102a and second 102b nodes may be located in different geographical locations to allow users at the different geographical locations to perform transactions with respect to their accounts maintained in the data set 106a, 106b at the geographical location closest to the transacting user to reduce network latency.

Although two nodes 102a, 102b are shown in FIG. 1, there may be more than two nodes in different geographical locations that each provide a copy of the same data set. Each of the plurality of nodes may broadcast transactions at their copy of the database to other of the nodes so the nodes strive to maintain a consistent copy of the data set across nodes.

The storages 106a, 106b may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAIVI), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The network 110 may comprise a Storage Area Network (SAN), a Local Area Network (LAN), a Wide Area Network (WAN), the Internet, an Intranet, etc.

Figure 2:
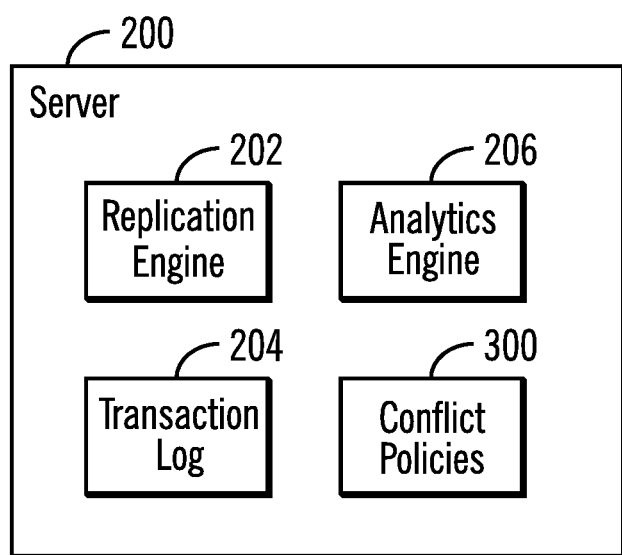
FIG. 2 illustrates an embodiment of a server at a computing site.

FIG. 2 illustrates an embodiment of a server 200, such as the servers 200a, 200b shown in FIG. 1, including a replication engine 202 to replicate changes to the data sets 106a, 106b logged in a transaction log 204 to other nodes providing instances of a data set; an analytics engine 206 to process replicated changes received from other nodes and the transaction log 204 to determine if there conflicts with respect to the received replicated changes and the local changes to the data set 106a, 106b; and conflict policies 300 indicating actions to perform when conflicts are detected.

Figure 3:
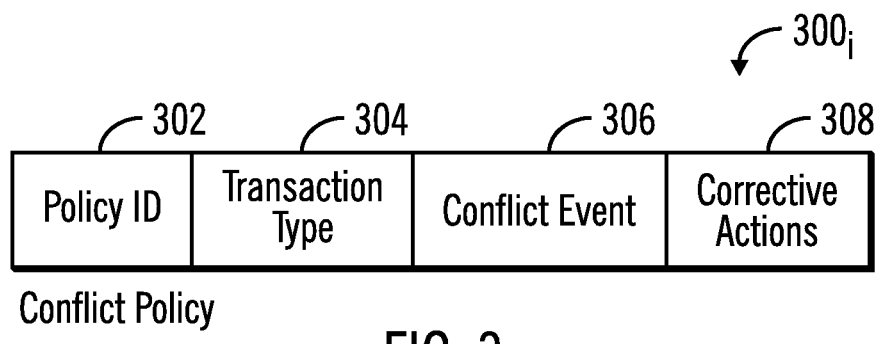
FIG. 3 illustrates an embodiment of a conflict policy to handle transaction conflicts.

FIG. 3 illustrates an embodiment of an instance of a conflict policy 300, maintained in the conflict policies 300, including a policy identifier (ID) 302; a transaction type 304 of a transaction directed to the data sets 106a, 106b, e.g., a database transaction to modify a database record, a financial transaction directed to a financial account, an application transaction to modify application data, etc.; a conflict event 306 indicating a condition that a record in the data sets 106a, 106b modified by a received transaction must satisfy for a conflict determination; and one or more corrective actions 308 to perform upon occurrence of the conflict event 306. There may be multiple conflict policies for different transaction types, conflict events and conditions to provide the same or different corrective actions 308 be performed upon occurrence of a conflict event.

Figure 4:
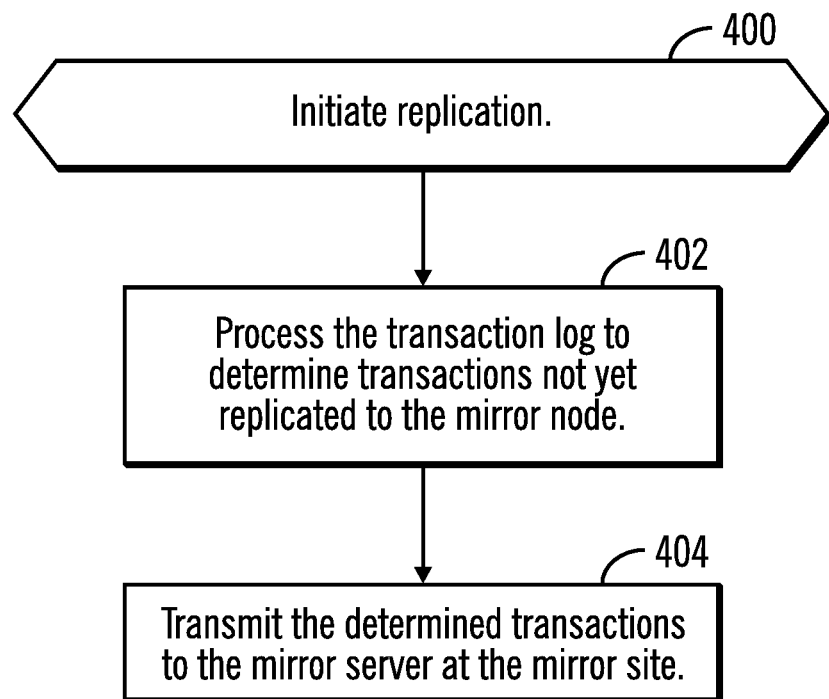
FIG. 4 illustrates an embodiment of operations to replicate transactions at one node to other nodes.

FIG. 4 illustrates an embodiment of operations performed by the replication engine 202 at one of the nodes 102a, 102b to replicate transactions at the data sets 106a, 106b. Upon initiating (at block 400) replication, the replication engine 202 processes (at block 402) the transaction log 204 to determine transactions not yet replicated to the mirror node. The determined transactions are transmitted (at block 404) to the mirror server 200a, 200b at the mirror node 102a, 102b to mirror transactions so the data sets 106a, 106b are maintained consistent among nodes. A replicated transaction may comprise a transaction that modifies a record or data in the data set 106a, 106b.

Figure 5:
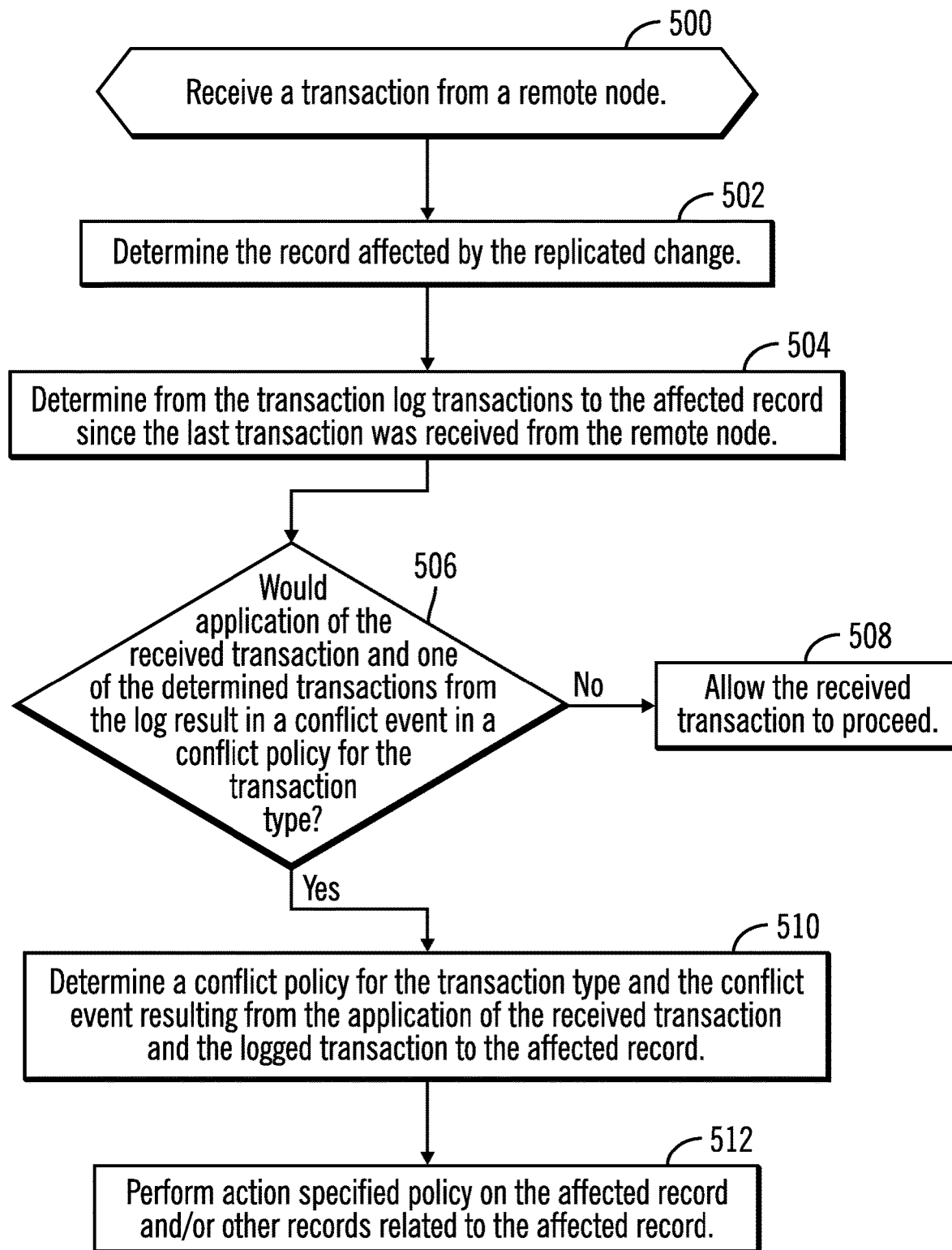
FIG. 5 illustrates an embodiment of operations to process a transaction from a remote node.

FIG. 5 illustrates an embodiment of operations performed by the analytics engine 206 at one of the nodes 102a, 102b to process a received transaction from a remote node 102b, 102a. Upon receiving (at block 500) a transaction from a remote node 102a, 102b with respect to the data set 106a, 106b at that remote node 102a, 102b, the analytics engine 206 determines (at block 502) a record in the local data set 106a, 106b affected by the received transaction. A determination is made (at block 504) from the transaction log 204 of transactions to the affected record since a last transaction was processed from the remote node 102a, 102b. A determination is made (at block 506) as to whether application of the received transaction and one of the determined transactions from the transaction log 204 would result in a conflict event 306 in a conflict policy $300_i$ for the transaction type of the transaction. A conflict event 306 may occur when the affected record would satisfy a condition upon application of the logged transaction and the received replicated transaction. There may be multiple conflict policies $300_i$ for one transaction type 304 to allow for different possible conflict events 306 that may occur for that transaction type 304. In such case, the analytics engine 206 may check for multiple conflict events 306 for the received replicated transaction of the transaction type 304, such as by performing an instance of the operation at blocks 506 to locate one conflict event 306 that is determined for the transaction type 304, i.e., one instance where the application of the received transaction with local transactions to the record would satisfy a condition indicating a conflict.

If (at block 506) no conflict would result, i.e., the condition is not satisfied by application of the received transaction, then the received transaction is allowed to proceed (at block 508). If (at block 506) application of the received transaction would result in a conflict with respect to one or more of the logged transactions, then a determination is made (at block 510) of a conflict policy $300_i$ for the transaction type 304 of the received transaction and the conflict event 306 resulting from the application of the received transaction to the determined affected record. The corrective action 308 for the policy $300_i$ is then performed (at block 512), which may involve changing the affected record based on the received transaction and logged conflicting transaction, sending notifications to a user that initiated the received replicated transaction, updating other records based on the extent to which the affected record satisfies the condition specified by the conflict event 306.

In certain embodiments, the satisfying the condition of the conflict event 306 indicates an error introduced by the application of the replicated change and the action for the conflict policy may specify to correct the error in the data set resulting from the application of the replicated change.

In one embodiment, the data set 106a, 106b may comprise a database and the condition indicating a conflict event may comprise a key not found error, column mismatch, row mismatch, etc. The action specified to be performed may involve correcting the error, such as changing the value for the affected record to correct the error.

In a further embodiment, the conflict policy may specify to allow the received replicated change that would result in a conflict with respect to the logged transactions to proceed so the replicated change and the log transactions are applied to the affected record. In such case, the corrective action may comprise allowing the replicated change to proceed, updating other records with information, and/or notifying an administrator or initiator of the transaction of the conflict.

Yet further, the corrective actions 308 may indicate to look at a history of updates to the data set record having the conflict, or the condition of the conflict event, to determine whether the history of this conflict is frequent, and if so taking an action based on repeated occurrences of the conflict event, such as allow or deny the replicated transaction.

Figure 6:
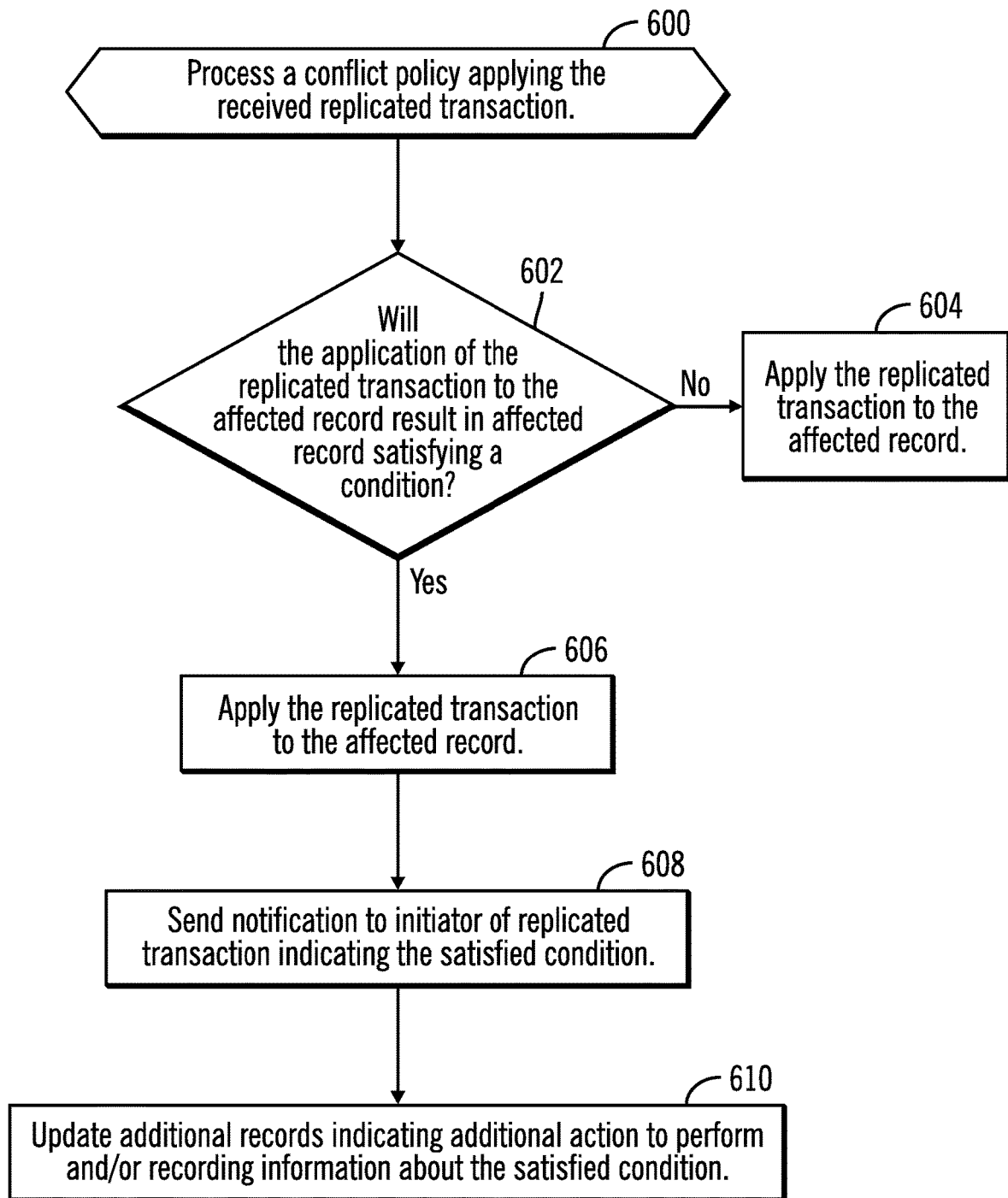
FIG. 6 illustrates an embodiment of operations to process a conflict policy that applies to a received replicated transaction.

FIG. 6 illustrates an embodiment of operations performed by the analytics engine 206 to process a conflict policy $300_i$ that permits application of the replicated transaction upon determining a conflict. Upon processing (at bock 600) a replicated transaction, the analytics engine 206 determines (at block 602) whether the application of the replicated transaction to the affected record would result in the affected record satisfying a condition specified by a conflict event 306 in a conflict policy $300_i$ for the transaction type 302 of the received transaction. If (at block 602) the application of the replicated transaction would not result in the conflict condition being satisfied, then there is no conflict and the replicated transaction may be applied (at block 604) to the affected record in the data set 106a, 106b. If (at block 602) the application of the replicated transaction would result in a conflict, then the corrective action 308 in one embodiment may nonetheless specify the analytics engine 206 to apply (at block 606) the received transaction to the affected record and send (at block 608) a notification to the initiator of the received transaction, the remote node 102a 102b indicating the satisfied condition. Alternatively, or in addition, a notification may be sent to an administrator of the data set 106a, 106b to indicate potential problems, possible fraud, etc. Further, the corrective actions 308 may specify to update additional records that indicate certain conditions related to the conflict that will result when the replicated transaction is applied.

Figure 7:
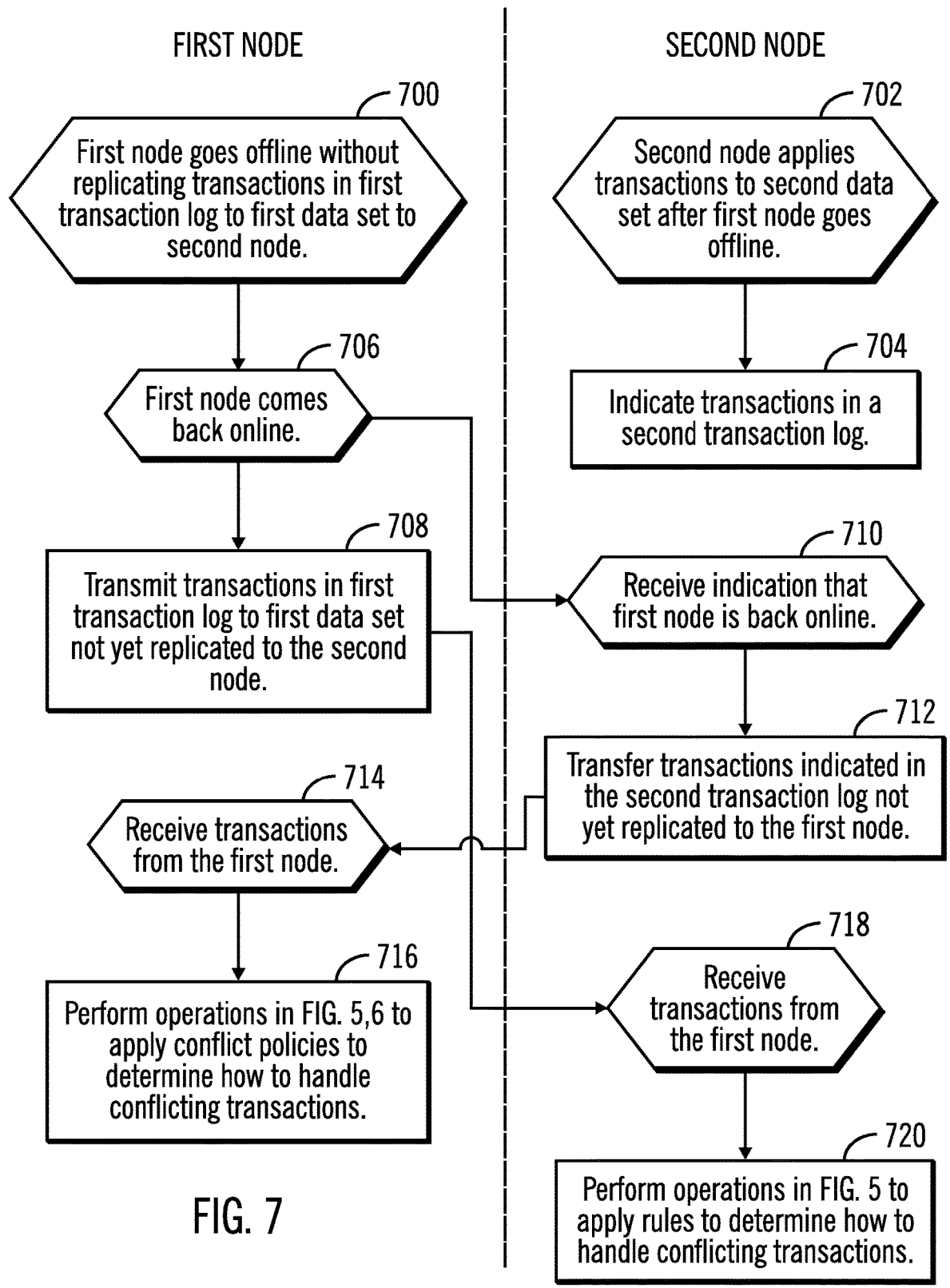
FIG. 7 illustrates an embodiment of operations to mirror transactions between nodes at different sites.

FIG. 7 illustrates an embodiment of operations performed at the first 102a and second 102b nodes replicating transactions to synchronize changes at the first 106a, and second 106b data sets when transactions occur at the nodes 102a, 102b during a network latency window during which transactions are not synchronized. The network latency window may be caused by one of the nodes 102a, 102b, referred to as first 102a and second 102b nodes, going offline, experiencing hardware problem, network disruptions, network latency, etc. The operations may be performed by the server 200a, 200b components. At block 700, the first node 102a goes offline (or is otherwise unable to replicate further transactions) without replicating transactions applied to the first data set 106a and indicated in a first transaction log 204a to the second node 102b. While the first node 102a is offline or there are delays in replicated transactions coming through, the second node 102b applies transactions to the second data set 106b. The changes at the second node 102b are indicated (at block 704) in a second transaction log 204b.

After the first node 102a comes back online (at block 706), the first node replication manager 202a transmits (at block 708) transactions in the first transaction log 204a to the first data set 106a not yet replicated to the second node 102b. Upon the second node 102a receiving (at block 710) indication that the first node 102a came back online, the second node replication engine 202b transfers (at block 712) transactions indicated in the second transaction log 204b not yet replicated to the first node 102a.

Upon the first node 102a receiving (at block 714) the replicated transactions from the second node 102b, the first node analytics engine 206a performs the operations in FIG. 5 or 6 to apply conflict policies $300_i$ to determine how to handle conflicting transactions. Similarly, the second node analytics engine 206b upon receiving (at block 718) replicated transactions from the first node 102a performs the operations in FIG. 5 or 6 to apply conflict policies $300_i$ to determine how to handle conflicting transactions.

The operations of FIG. 7 allow multiple nodes 102a, 102b in a mirror synchronization relationship to process transactions at one node that were not replicated during a replication latency window during which nodes may not be replicating transactions due to being offline, network disruptions, hardware failures, or general latency. During this replication latency window, numerous transactions would have occurred locally at the nodes, and when the delayed transactions finally are replicated, they may have conflicts with the transactions applied at the site during the replication latency window. With the operations of FIG. 7, the same conflicts may occur at both the first 102a and second 102b nodes when the transactions are replicated between the nodes 102a, 102b, including transaction that were delayed from being replicated while other transactions to the same data set records were being applied at the nodes. The conflict policy is thus applied at both nodes 102a, 102b to ensure conflict handling of the same conflict that is replicated between sites.

One example of a conflict policy $300_i$ involves replication of financial transactions to a customer bank account occurring between copies of the financial accounts at different locations. In one embodiment, the corrective action 308 may implement a policy such as the "customer is always made whole". For instance, assume two account holders, first holder and second holder, share a joint checking account. A situation may occur where the first holder withdraws $10,000 from the joint checking account that has a current balance of $11,000 and the second holder simultaneously withdraws $2000 from the account at a different geographical location. Both withdrawals succeed, because they are processed at different first and second sites, e.g., first and second nodes 102a, 102b, having different copies of the account database that are synchronized. Since both transactions occurred within a replication latency window, an overdraft event is not immediately detected. For instance, if the second holder's withdrawal occurs after the first holder's, when the second holder's change is replicated to the first node 102a that received the first holder's transaction, the conflict is detected at the first node 102a.

With the described embodiments, the conflict policy $300_i$ would detect that an overdraft event occurred, i.e., the conflict event 306. If the corrective action 308 provides for overdraft protection, then the corrective action 308 may specify to apply the second holder withdrawal to the account at the first node 102a and send a warning message. If the corrective action 308 does not provide for overdraft protection for this joint account, then a policy of "the customer is always made whole" may apply, which results in a corrective action 308 that allows the withdrawals to occur under the assumption that the customers did not know what was occurring. In such case, the corrective action 308 temporarily assigns overdraft protection if the corrective action 308 determines that the account holders have other accounts with sufficient funds to cover the overdraft, and sends a message alerting the account holders of the event.

In another embodiment, the conflict policy $300_i$ may have corrective actions 308 that consider a history of transactions that occurred prior to the conflict event 306. Assuming the above scenario with the withdrawals by the first and second account holders from their joint account, the bank performs interest calculations at both sites 102a, 102b. When the first account holder withdraws $10,000 from the original balance of $11,000, the first node 102a calculates interest on the remaining $1000 balance and adds the calculated interest to the joint account. When the second holder withdraws $2000 from the original balance of $11,000, the second node 102b calculates interest on the remaining $9000 balance and adds the calculated interest to the account, which is higher than the first calculated interest because the balance is higher. If the sequence of operations had occurred at one node 102a, 102b, or site 102a, 102b, then only one interest rate calculation would have occurred and it would have been applied against either a balance of $1000 or $0 (assuming overdraft protection). Neither of which would equate to the interest aggregate that would occur if calculated on separate sites assuming an initial $11,000 balance.

Again assuming that the second holder's withdrawal generates the first conflict at the first holder first site 102a, the corrective action 308 may consider the history of transactions (i.e. $10,000 deduction followed by an interest calculation), compare them to the timing of the second holder's withdrawal (contained in the replicated transaction) and make a determination as to what the proper interest calculation should be. The subsequent interest calculation change, flowing in from the second site 102b, could then be discarded (by either examining the history again, or 'remembering' the previous decision).

Further, the conflicts may occur in both directions. If the same conflict policies $300_i$ are applied in-place at both sites 102a, 102b, no discrepancies should be experienced.

In certain embodiments, the conflict event 306 may indicate that fraud has occurred, and the corrective action 308 may specific actions to cause the analytics engine 206 to take actions responsive to the fraud.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
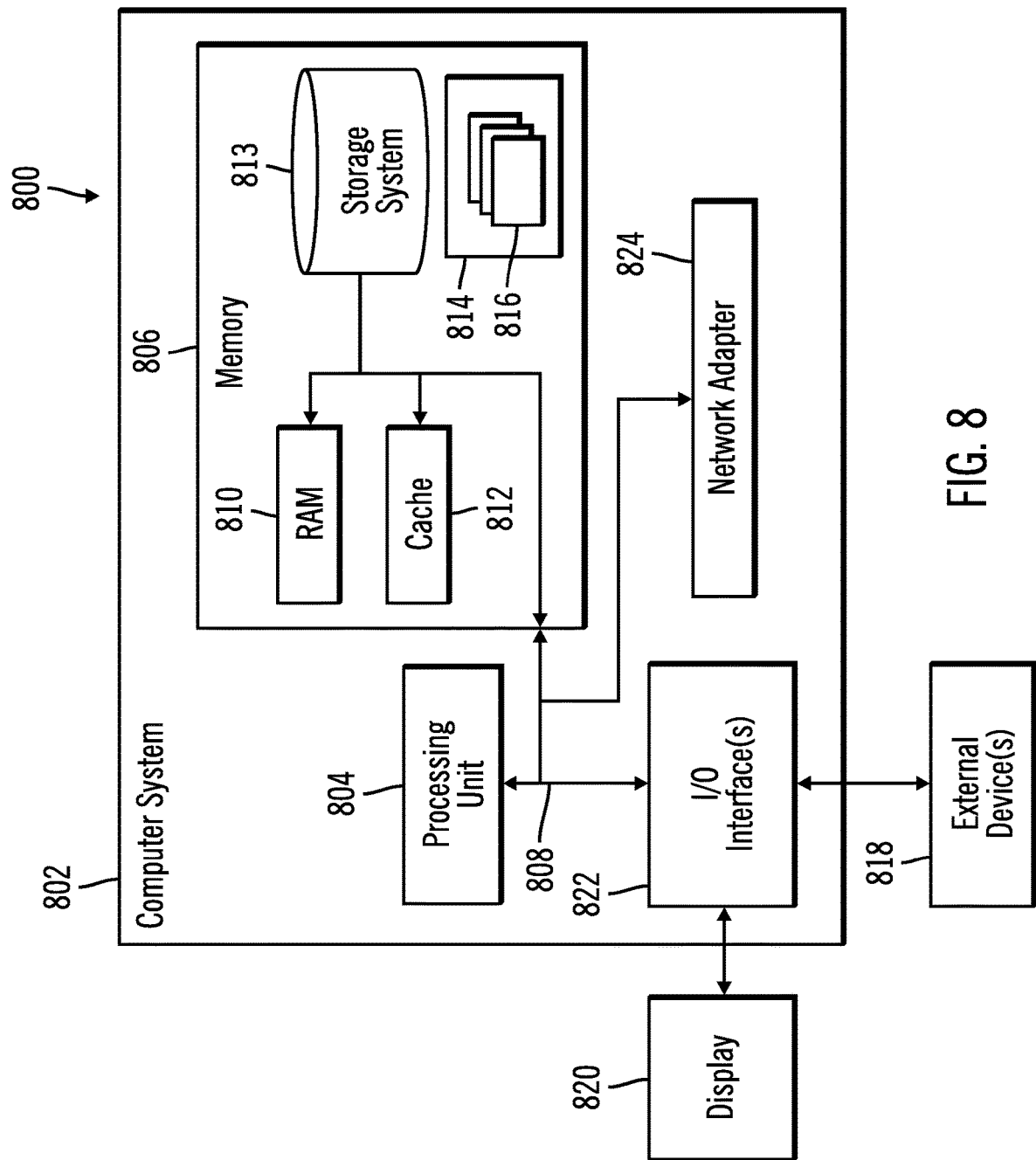
FIG. 8 illustrates a computing environment in which the components of FIG. 1 may be implemented.

The computational components of FIG. 1, including the servers 200a, 200b may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disk (CD) Read-Only Memory (ROM), Digital Video Disc (DVD)-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for determining conflicts of changes updating instances of a data set at different nodes in a network including a first node and a second node, wherein each of the nodes includes one instance of the data set, comprising:

receiving at the second node having a second instance of the data set a first transaction replicated from the first node, wherein the first transaction was applied to a first instance of the data set of the first node, wherein the first node replicates transactions at the first node to the first instance of the data set to the second node to apply to the second instance of the data set, wherein the first and the second nodes receive transactions from users for the first and second instances of the data set at the first and the second nodes, respectively;

determining, at the second node, whether application of the replicated first transaction from the first node would result in a conflict event with a second transaction, received at the second node from a user and that was previously applied to the second instance of the data set, in response to receiving the replicated first transaction; and applying a conflict policy at the second node to perform a first action in response to determining application of the received replicated first transaction and the second transaction, already applied to the second instance of the data set, would result in the conflict event, wherein the conflict policy is applied to the first node to perform a second action at the first node to handle the conflict event when the first node receives a replication of the second transaction to the second instance of the data set at the second node.

2. The method of claim 1, wherein the first and second actions apply the first and second transactions to the second and first nodes, respectively, and notify an initiator of the first and second transactions resulting in the conflict event.

3. The method of claim 1, wherein the first node maintains a first update log of transactions applied to the first instance of the data set and the second node maintains a second update log of transactions applied to the second instance of the data set, wherein the second node determines the conflict event by determining whether the first transaction conflicts with the second transaction indicated in the second update log.

4. The method of claim 1, wherein the determining the conflict event comprises determining whether application of the first transaction to the second instance of the data set would result in a satisfying a condition, wherein the conflict policy specifies an additional action to perform in response to determining that application of the first transaction would result in the satisfying the condition.

5. The method of claim 4, wherein the satisfying the condition indicates an error introduced by the application of the first transaction to the second instance of the data set, wherein the first action specifies to correct the error in the second instance of the data set resulting from the application of the first transaction.

6. The method of claim 4, wherein the first and second instances of the data set comprise databases, and wherein the satisfying the condition comprises a record in the first and/or second instance of the data set having at least one of a key not found error, column mismatch, row mismatch, and wherein the first and the second actions perform an operation on the record including the error at the second and first instances of the data set, respectively, to correct the error.

7. The method of claim 4, wherein the first and second actions of the conflict policy specify to allow the first and second transactions that result in the satisfying the conflict event to be applied to the second and first instances of the data set, respectively, and wherein the first and second actions take corrective action that does not alter the first and second transactions made to the second and first instances of the data set, respectively.

8. The method of claim 1, wherein a plurality of intervening transactions are made to the second instance of the data set, including the second transaction, between a time of receiving the first transaction and a previous replicated transaction from the first node applied to the second instance of the data set received at the second node before the first transaction, wherein the operations further comprise:

determining whether the first transaction conflicts with the plurality of intervening transactions at the first instance of the data set.

9. The method of claim 1, wherein the applying the conflict policy comprises:
   applying the first transaction to a first record in the second instance of the data set; and
   modifying a second record in the second instance of the data set based on content of the first record resulting from applying the first transaction.

* * * * *